Jan. 27, 1959 E. G. ETES ET AL 2,870,939
VENDING MACHINE
Filed Feb. 20, 1953 6 Sheets-Sheet 1
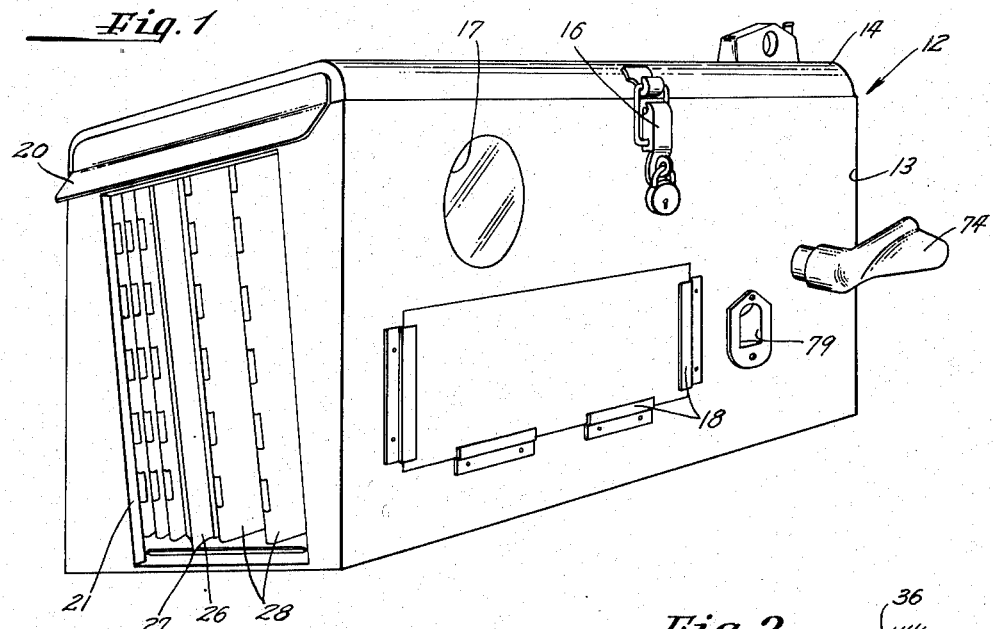
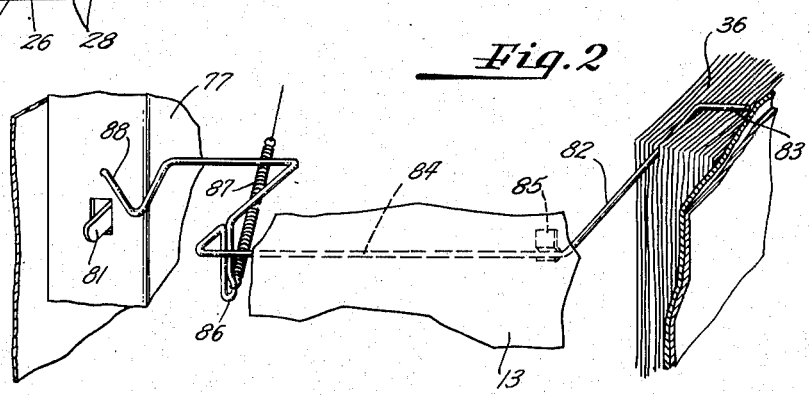
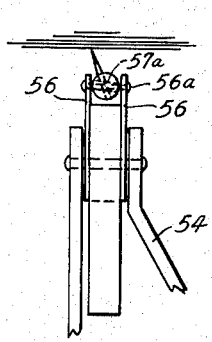
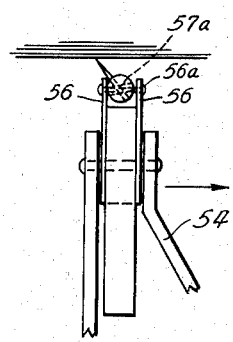
Inventors
Elmer G. Etes
William K. Baer
George A. Baer
BY McCanna and Morsbach
Attys.

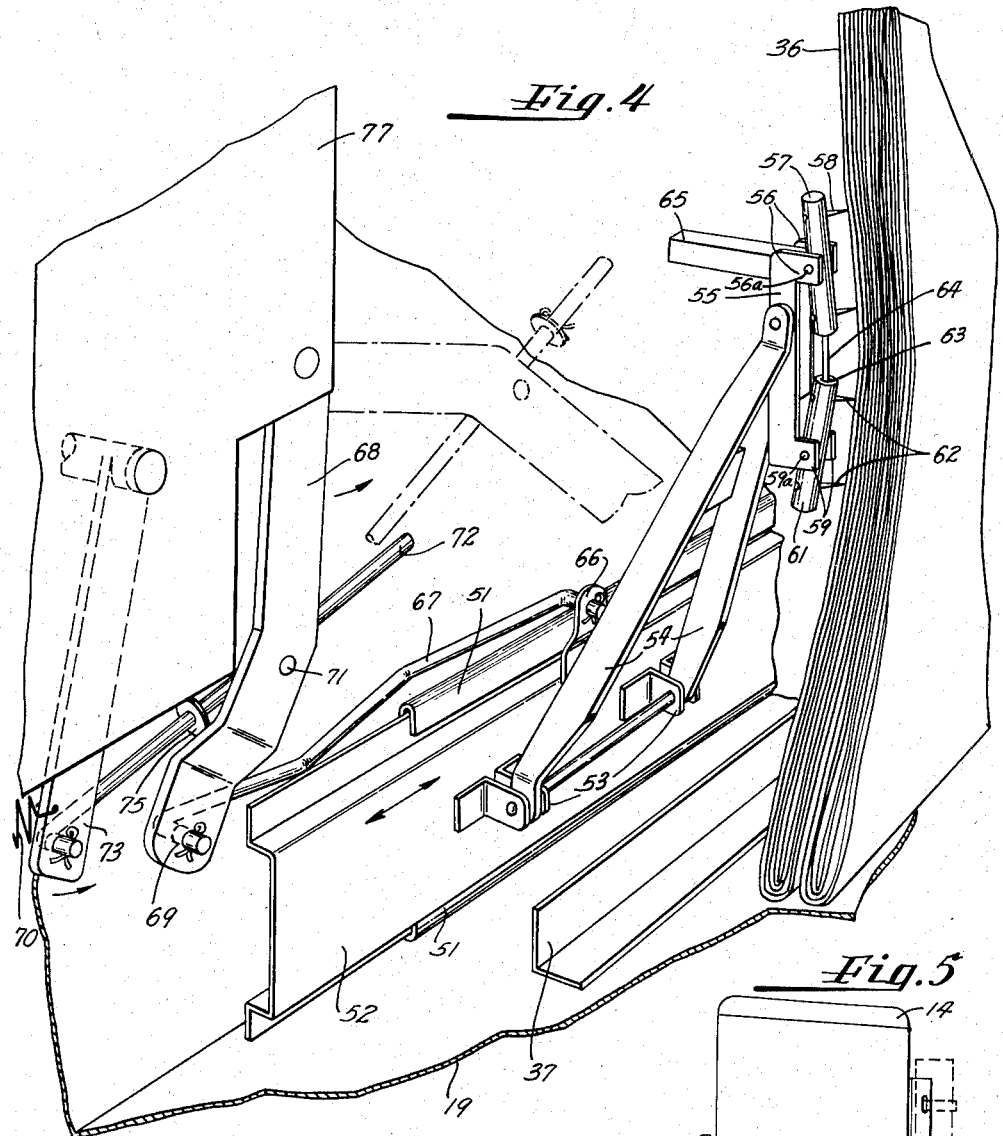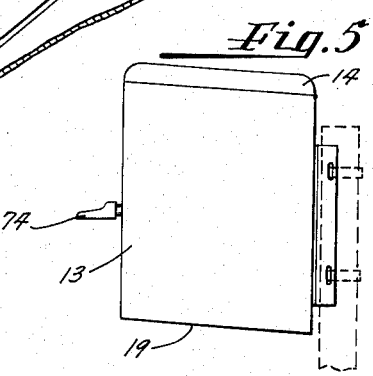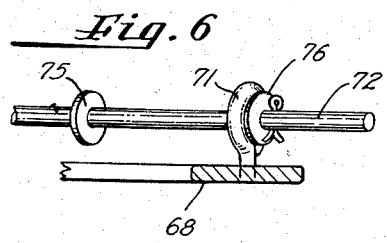

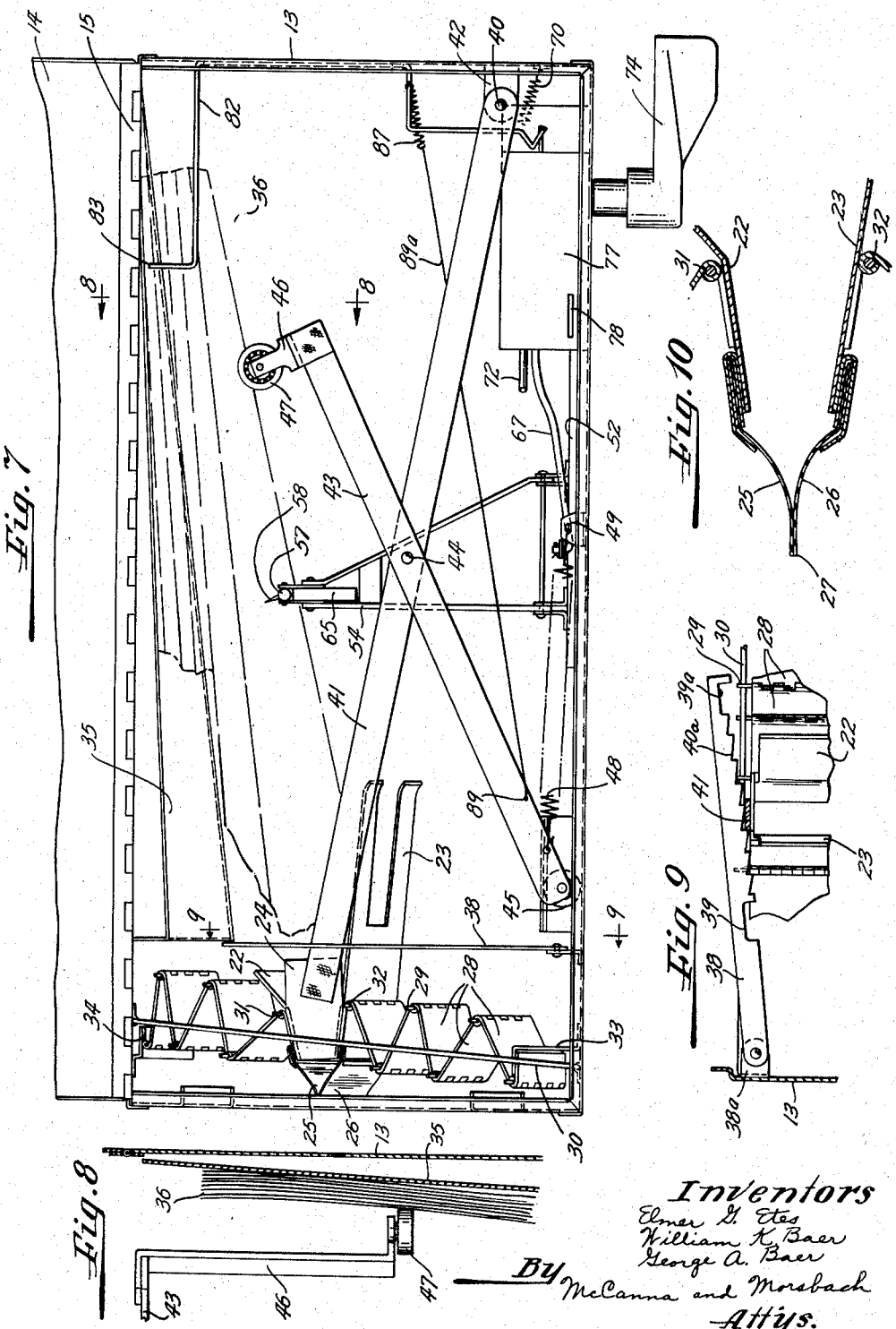

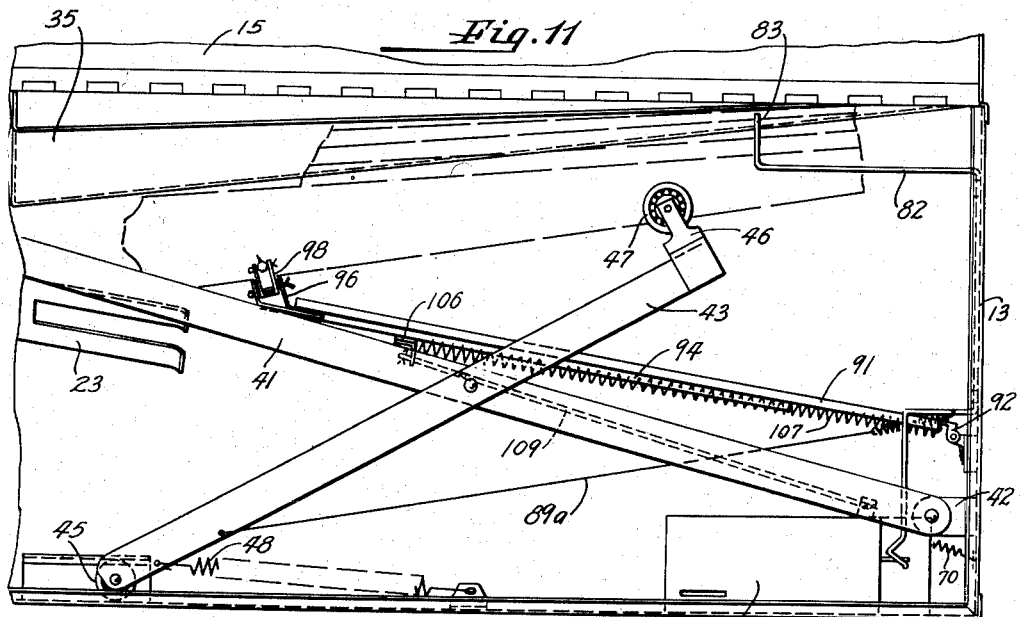
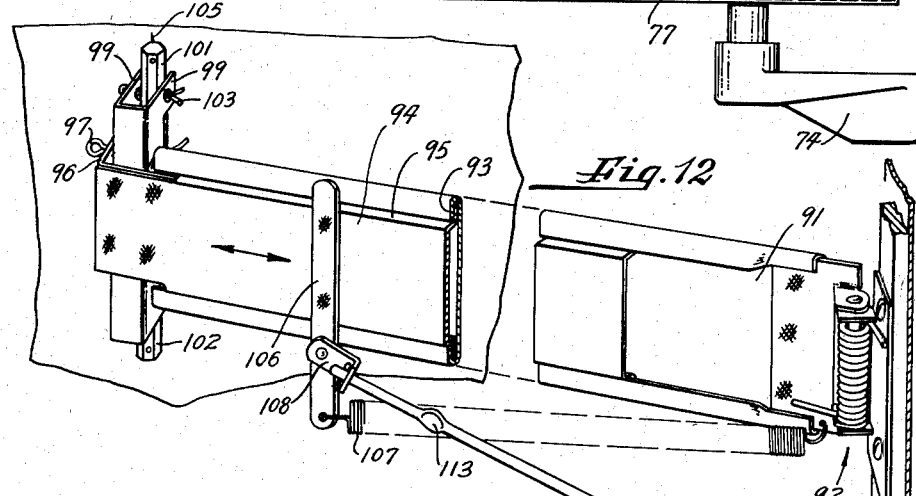
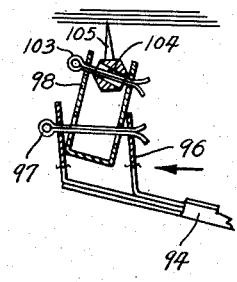
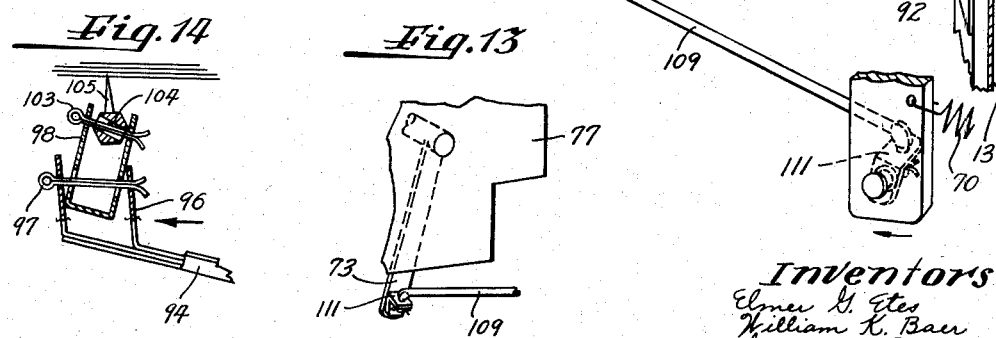

Jan. 27, 1959

E. G. ETES ET AL 2,870,939

VENDING MACHINE

Filed Feb. 20, 1953

Inventors
Elmer G. Etes
William K. Baer
George A. Baer
By McCanna and Morsbach
Attys Jan. 27, 1959   E. G. ETES ET AL   2,870,939
VENDING MACHINE
Filed Feb. 20, 1953   6 Sheets-Sheet 6
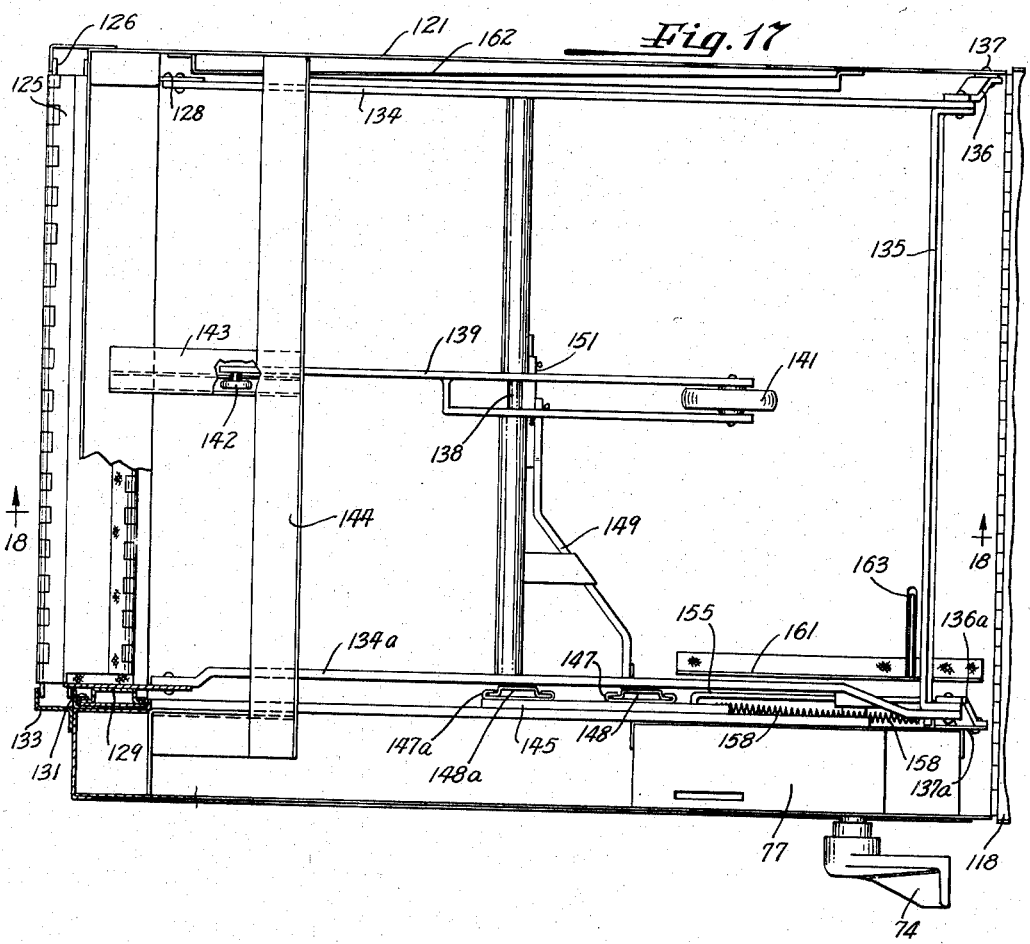
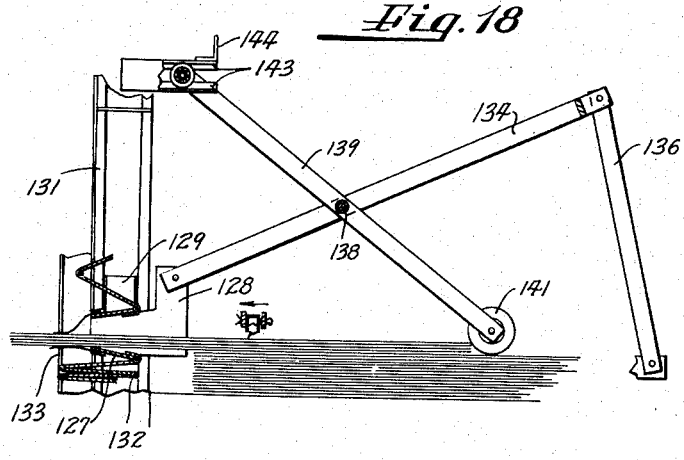
Inventors
Elmer G. Etes
William K. Baer
George A. Baer
By McCanna and Morsbach
Attys.

United States Patent Office 2,870,939
Patented Jan. 27, 1959

2,870,939

VENDING MACHINE

Elmer G. Etes, William K. Baer, and George A. Baer, Rockford, Ill.; said William K. Baer and said George A. Baer assignors to said Elmer G. Etes Application February 20, 1953, Serial No. 337,928

15 Claims. (Cl. 221—213)

This invention relates to vending machines of the type intended for storing and vending newspapers and the like and which is particularly adapted to be coin controlled.

In recent years economic conditions have greatly reduced the newsboy sale of newspapers and magazines on the streets of the country which has resulted in inconvenience to the public and loss of revenue to the publishers. As a result the newspaper publishers and organizations engaged in the distribution of newspapers have attempted to employ coin-controlled vending machines for the purpose, but in their present state of development, such machines are quite inadequate due primarily to their lack of dependability. So far as we know, none of these machines have operated satisfactorily under normal conditions of use. They must be capable of dependable operation in the open, summer and winter, where they are subjected to rain, snow and sleet; they must operate reliably with newspapers of different thicknesses and varying paper characteritsics; and they must function when operated by many different types of users, some of whom will operate the ejection mechanism violently and rapidly, others slowly and timidly, and still others with the intent of obtaining the newspaper without inserting a coin.

The primary object of the invention is to provide a vending machine which will satisfactorily meet the above requirements, which will be sturdy and which can be manufactured at a cost such as to permit their widespread use.

A further object of the invention is the provision of a vending machine which will not be incapacitated by weather conditions.

Another object is the provision of novel means for gripping the papers for ejection purposes and novel means for advancing the same in accordance with the reduction of thickness of the paper stack.

A further object is the provision in a vending machine of a novel arrangement by which ejection is prevented without the insertion of a coin.

Other objects and advantages will appear from the following description and the accompanying drawings, in which:

Figure 1 is a perspective view of a vending machine embodying the invention;

Fig. 2 is a view of the mechanism for operating the coin return when the papers are exhausted from the machine;

Figs. 3 and 3A are fragmentary top views showing the pin blocks and pin block holder of the ejector mechanism;

Fig. 4 is a fragmentary perspective view showing the ejecting mechanism and the ejector linkage;

Fig. 5 is an end elevational view showing the preferred manner of mounting the dispensing mechanism on a post or the like;

Fig. 6 is a fragmentary view of the ejector linkage showing the lost motion connection;

Fig. 7 is a top view of the device with the cover open;

Fig. 8 is a sectional view on the line 8—8 of Fig. 7;

Fig. 9 is a fragmentary sectional view along the line 9—9 of Fig. 7;

Fig. 10 is a transverse section through the mouth of the dispensing mechanism;

Fig. 11 is a top view similar to Fig. 7 showing a modification of the ejecting mechanism;

Fig. 12 is a perspective view of the ejecting mechanism of Fig. 11;

Fig. 13 is a fragmentary view showing the construction for actuating the ejector mechanism of Fig. 11;

Fig. 14 is a top view of the pin block and pin block holder of the form shown in Fig. 11;

Fig. 17 is a top view of the form of Fig. 15, and

Fig. 18 is a fragmentary sectional view taken on the plane 18—18 of Fig. 17 showing the means for positioning the delivery mouth.

Figure 15:
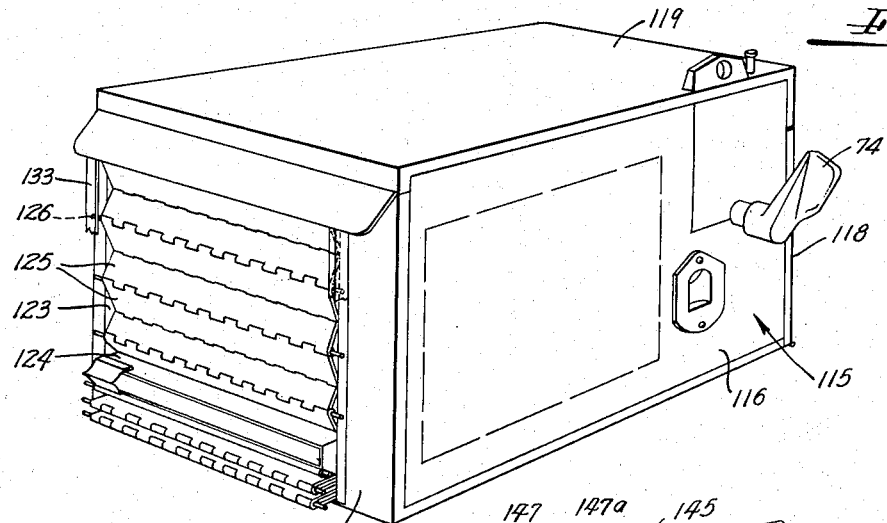
Fig. 15 is an external perspective view of a vending machine showing a second embodiment of the invention.

Referring first to the embodiment shown in Figs. 1 through 10, the vending device includes a cabinet designated generally by the numeral 12, preferably formed of sheet metal and adapted to enclose the newspapers and operating mechanism. In this instance the cabinet includes a base 13 and a cover 14 hinged along the rear edge of the base 13 as indicated at 15 (Fig. 7). Suitable latch mechanism 16 may be employed for locking the cover to the base. A transparent window 17 may advantageously be employed to permit viewing of the contents, and brackets 18 may be attached to the front of the cabinet for carrying cards or other indicia indicating the contents of the vending machine. In this instance the cabinet is so constructed that the bottom 19 thereof slopes downwardly from front to rear to provide a sloping support for the papers, as will presently be described, in this way avoiding the necessity for employing a sloping false bottom for supporting the stack of papers. One end of the body has a rectangular opening 21 (see Fig. 1) extending from points near the bottom and top of the body through which the newspaper is ejected, which opening is covered by a folding closure and by a dispensing mouth best shown in Figs. 1, 7 and 10. An outwardly disposed flange 20 attached to the end of the cover projects over the opening 21 and in a measure acts to deflect rain and snow from entrance into the opening 21. The mouth is formed by converging side members 22 and 23, the upper edges of which are interconnected by a top member 24 to form a rigid rectangular funnel-shaped section. Attached to the converging edges of the members 22 and 23 are flexible lips 25 and 26 which extend substantially the full length of the opening 21, these lips being made of a form-retaining flexible material such as rubber, stiff fabric, flexible metal or the like so arranged that their outer edges 27 rest in engagement. The lips are so arranged as to substantially prevent the entrance of rain, snow or extraneous material into the cabinet but to flex outwardly for the passage of a magazine or newspaper therebetween and to return to the position shown in Fig. 10 after the paper is extracted. On each side of the mouth are flexible closure members formed from leaves as indicated at 28 which are interconnected in the manner of a piano hinge by means of vertically disposed pintles as shown at 29, thus forming a series of leaves capable of folding upon themselves to permit of lateral adjustment of the position of the mouth. The pintles 29 project upwardly beyond the upper edge of the leaves as best shown in Fig. 7, and a wire 30 extends from side to side of the body being interposed between adjacent pintles to thereby prevent the hinge points from coming into or passing beyond alignment, thus maintaining the leaves in accordion pleated relationship as shown. The flexible closures are attached at one end to the members 22 and 23 as indicated at 31 and 32 and to the side wall of the body through brackets 33 and 34.

In the present embodiment of the invention the newspapers are stacked in edgewise relationship along the rear wall of the cabinet, as indicated at 36 (Fig. 4), the body having an angularly disposed panel 35 against which the stack rests for the purpose of disposing the stack at a slight angle with respect to the back of the cabinet to cause the paper to move toward the center of the cabinet as it is ejected. An upstanding flange 37 is secured to the bottom for the purpose of retaining the stack in upright position.

Mechanism is provided for adjustably retaining the dispensing mouth in a position opposite the end of the top newspaper of the stack. This mechanism includes a bar 41 rigidly secured to the top plate 24 of the mouth and extending lengthwise of the cabinet, the opposite end thereof being pivotally secured to the opposite end of the cabinet by means of a bracket 42 and pivot pin 40. This enables the mouth to move laterally of the opening 21 from side to side thereof, the mouth swinging about the pivot pin 40 for this purpose. A second bar 43 is pivotally attached to the bar 41 intermediate its ends as indicated at 44, the bar 43 having a roller 45 at one end thereof adapted to bear against the front side of the body and having a depending bracket 46 at its opposite end carrying a roller 47 positioned to bear against the top paper of the stack. A coil tension spring 48 has one end attached to the bar 43 adjacent the roller 45 and its opposite ends secured to a bracket 49 on the body so as to urge the bar 43 in a counterclockwise direction facing Fig. 7 so that the roller 45 is maintained in constant contact with the body and the roller 47 in contact with the top newspaper of the stack. It will be seen that as the roller 47 moves inwardly in response to removal of successive papers, the bar 41 is rotated in a clockwise direction shifting the dispensing mouth into a position opposite the succeeding newspaper. A latch arm 38 (Fig. 9) is pivotally secured to the front side of the body by a bracket 38a and extends transversely across the cabinet above the bar 41, the arm resting by gravity against the upper side of the bar. The latch arm is provided with a notch 39 at a point adjacent the bracket 38a permitting the arm to drop down over the bar 41 and thereby latch the bar and the cross link mechanism comprising the bar 41 and the bar 43 in a retracted position to facilitate the introduction of the stack of newspapers. A similar notch 39a is provided adjacent the opposite end of the latch arm 38 for the purpose of latching the links and the dispensing mouth when the last paper has been dispensed. Intermediate the notches 39 and 39a are teeth-like notches 40a sloping in such manner as to allow the bar 41 to ratchet therealong in the course of successive dispensing operations. The purpose of the latch bar 38 and to a certain extent of the rod 30 is to prevent the parts from being manually displaced by vandals who may grasp the dispensing mouth or the leaves from the outside through the opening 21 and shake or force the same either maliciously or for the purpose of attempting to produce malfunction in the device.

The papers are ejected from the stack by means of ejecting mechanism best shown in Fig. 4. This includes a pair of ways 51 secured to the front side of the body adjacent the bottom within which is mounted a reciprocable slide 52. Brackets 53 are attached to the face of the slide and pivotally support a frame 54. At the upper end of the frame 54 there is pivotally mounted a holder 55 which has outwardly disposed upper ears 56 between which are pivotally mounted a pin block 57 carrying spaced pins 58. The lower end of the holder 55 likewise has spaced ears 59 pivotally supporting a lower pin block 61 likewise provided with pins 62. The lower end of the pin block 57 and the upper end of pin block 61 are provided with openings 63 for the loose reception of a spring wire 64 designed to hold the pin blocks more or less in alignment but to permit them to swing through a considerable arc with respect to each other to permit the pins of the two blocks to adjust themselves to the curvature of the paper. The holder 55 has a counterbalancing bar 65 which acts to normally retain the holder 55 in upright position substantially as shown in Fig. 4. It will be seen that the frame 54 extends across the cabinet so that the weight of the holder and pin blocks swings the ejector into contact with the stack of papers by gravity. The pin blocks 57 and 61 are supported on rods 56a and 59a fixed in and spanning ears 56 and 59, respectively. The rods pass through holes in the blocks as shown at 57a to support the blocks thereon, the holes being of substantially greater diameter than the rods, the pins thus being supported on the frame 54 for quaquaversal movement. The pins 58 and 62 are needle-like in configuration and provided with sharp points, the pins being fixed in the blocks so that when they rest against the topmost paper the angle between the pins and the plane of the paper is somewhat greater than 90° on the left hand side of the pins facing Fig. 7 as shown in Figs. 3 and 3A. When the slide 52 is moved toward the left facing Fig. 7, the pins penetrate the upper layers of the newspaper a short distance as shown in Fig. 3 to grip the same and thereby move the paper longitudinally of the cabinet and with respect to the balance of the papers of the stack without effecting a tear in the paper. At the inception of this feeding movement the blocks rotate on the rods 56a and 59a. When the slide reverses its direction of movement, the pin blocks rotate on the rods to decrease the angularity of the pins with respect to the paper as shown in Fig. 3A, moving out of the paper and sliding thereover without tearing.

The slide 52 is moved through an amplitude sufficient to move the topmost paper laterally toward the left facing Fig. 7 until the forward edge thereof protrudes from between the lips 25 and 26 a distance sufficient to be grasped by the operator so that it may thereafter be withdrawn by force exerted on the exterior portion of the paper. The roller 47 is so positioned that at the end of the ejecting movement of the slide the roller passes over the trailing edge of the paper to resist return movement thereof when the pins slide back along the paper. This motion of the slide is imparted through an ear 66 affixed to the slide 52 through which the curved end of a rod 67 passes, the opposite end of the rod 67 passing through the lower end of a link 68 as shown at 69. Affixed to the link 68 intermediate its ends is an eyelet 71 through which passes a rod 72 having one end connected to an arm 73, which arm is in turn connected for rotation to an external handle 74 through which the mechanism is operated from the exterior of the cabinet. When the handle 74 is depressed the arm 73 is moved in the direction of the arrow, bringing a collar or other abutment 75 into engagement with the eyelet 71 through a lost motion movement and thereafter swinging the arm 68 to move the slide 52 to the right facing Fig. 4 to thereby dispense the uppermost newspaper. When the handle 74 is released the arm 73 returns to its normal position as shown in Fig. 4, thereby bringing the rod 72 to the position shown in Fig. 6. A shoulder 76 engages the eyelet 71 to return the slide 52 to its initial position, the arm 73, rod 72 and the slide being returned in response to action of a tension spring 70 secured at one end to the arm 73 and at its opposite end to the end of the cabinet as shown in Fig. 7. A conventional coin control mechanism indicated generally by the numeral 77 is provided which operates in the usual way, and since it per se forms no part of the present invention, it is not described in detail. It is sufficient to say that it has a coin slot 78 into which coins are inserted and a latch mechanism operative between the handle 74 and the arm 73 for normally latching the arm 74 against substantial rotation sufficient to move the ejector through a complete stroke. The coin control is also provided with the usual coin return 79 and a lever 81 adapted on lateral movement to deflect the coins from the depository into the coin return.

As shown in Fig. 2, means are provided for actuating the coin control mechanism to deflect the coins to the coin return in response to the exhaustion of papers from the dispensing mechanism. For this purpose there is attached to the end wall of the body a feeler wire comprising a feeler arm 82 having a finger 83 adapted to rest on the top of the stack, the arm 82 being part of a cross shaft 84 rotatably secured on the end wall of the body by clips 85. The opposite end of the wire carries a depending loop 86 to which is attached a spring 87. The wire thence extends to an operating finger 88 so positioned that when the finger 83 rests upon the stack of magazines the operating finger 88 is elevated above the member 81. When the last newspaper is removed the feeler finger 83 drops downward, bringing the operating finger 88 against the element 81, deflecting it laterally so that thereafter the coins inserted through the coin slot will be directed to the coin return 79 in the usual manner. The coil spring 87 is connected to the link 43 as indicated at 89 by a wire 89a. The purpose of the spring 87 and the wire 89a is to lift the finger 83 upwardly to a retracted position when the bars 41 and 43 are moved to the retracted position and the bar 41 is engaged within the notch 39 so as to facilitate the insertion of the papers. Since the roller 49 moves to the left facing Fig. 7 when the bars are retracted, the feeler member is likewise rotated to lift the finger 83 out of the way. The spring 87 merely provides some resiliency in this connection to prevent bending or damaging of the feeler mechanism should the device be improperly operated.

A modified and in some ways an improved form of ejecting mechanism is shown in Figs. 11 through 14 substituted for that heretofore described, the vending machine being otherwise identical. In this form of the ejecting mechanism a slide support arm 91 is pivotally secured to the end 13 of the cabinet by means of a spring hinge 92 arranged to urge the arm in a clockwise direction facing Fig. 11. The upper and lower edges of the arm are bent as shown at 93 to provide ways for the reception of the edges of a slide 94 which reciprocates on the arm, the central portion of the slide being bent outwardly as indicated at 95. One end of the slide projects beyond the free end of the arm 91 and carries a channel 96 fixed to the slide and having openings near its upper end for the reception of a rod in the form of a cotter pin 97 spanning the sides of the channel as shown in Fig. 14 to support a holder 98 in the form of a channel of U-shaped cross-section. The holder 98 is of substantially lesser width than the space between the sides of the channel 96 and has holes for the passage of the cotter pin 97 sufficiently large for the holder to move laterally thereon into contact with the sides of the channel as shown in Fig. 14. The holder 98 has spaced upper and lower ears such as those shown at 99 (Fig. 12) corresponding to the ears 56 and 59 of Fig. 4 which carry pin blocks 101 and 102 supported on cotter pins 103 passing through enlarged holes 104 in the pin blocks to enable the blocks to rotate as described in connection with Figs. 3 and 3A. The pin blocks 101 and 102 carry pins 105 and are interconnected in the manner shown in Fig. 4. A finger 106 is secured to the center portion of the slide and a coiled tension spring 107 extends between the finger and the arm 91 at a point adjacent the hinge to normally draw the slide to the right facing Fig. 12 until the channel 96 abuts against the end of the arm. Also secured to the finger is a bracket 108 having a hole through which the end of an actuating rod 109 passes. The opposite end of the rod passes through a second bracket 111 fixed to the driving arm 73 operated from the exterior of the cabinet as previously described. The rod has cotter pins at its ends to retain the rod in the brackets and the rod is flattened as indicated at 113.

The ejector operates in a manner very similar to that heretofore described except that in the form shown in Fig. 4 the frame 54 rotates on a horizontal axis and the pins are held against the stack by gravity. In the form of Figs. 11 and 12 the ejector mechanism is supported on a vertical axis by the spring hinge 92 and the pins are urged against the stack under spring tension. To insert a stack of papers the arm 91 and associated mechanism together with the bars 41 and 43 are swung to the front side of the cabinet, the finger 83 is raised and the stack is dropped into position. When the above-mentioned parts are released they return under spring tension to their proper positions engaging the stack. When the handle 74 is depressed the lever 73 is moved in a clockwise direction facing Fig. 12. The early part of this movement is lost motion until the enlargement 113 engages the bracket 108. With further movement the slide 94 moves outwardly in the slide holder 91, and at the inception of this movement the pins and associated mechanism move from a position corresponding to that shown in Fig. 3A to the position shown in Fig. 14, the points of the pins penetrating the surface of the newspaper. Thereafter the topmost paper is caused to slide with respect to the stack so that its end enters the mouth between the elements 22 and 23 and passes through the lips 25 and 26 to a point at which the paper can be grasped by the user and withdrawn from the housing. Upon release of the handle 74 the spring 107 draws the slide 94 back toward its starting position. The early part of this movement causes the slide to move with respect to the pin holder 98 so that the pin holder and the pin blocks swing back to decrease the angularity between the pins and the surface of the paper so that the pins will slide smoothly thereover in the manner illustrated in Fig. 3A.

A further embodiment of the invention is illustrated in Figs. 15 through 18, wherein the newspapers or magazines are carried in a flat horizontal position arranged in superimposed relation one upon the other to form a stack. The mechanism comprises a generally rectangular cabinet 115 having a front wall 116, end walls 117 and 118 and a top 119 and a rear wall 121. The cabinet has the usual coin slots, coin return and the like similar to those heretofore described. The end 118 of the cabinet is conveniently hinged as shown at 122 so that it may be dropped down for the insertion of the stack of papers, the end panel being normally latched and locked into position by any of the usual mechanisms.

The end 117 of the cabinet has a dispensing opening 123 similar to that shown at 21 in Figure 1, and is provided with a dispensing mouth 124 connected at upper and lower edges with closures formed by metal leaves 125 connected by pintle pins 126 to form a construction analogous to that shown in Figs. 1 and 7, the mouth and closures being substantially identical except for being arranged in a horizontal direction. In this instance the mouth is formed by upper and lower converging members 127 extending horizontally across the opening and interconnected at their ends by end members 128, which are in turn secured to slides 129 carried in vertical ways 131 near opposite corners of the cabinet to guide the mouth in its vertical movement. One series of the pintle pins 126 project within the edges of the slide 131 as shown at 132, whereas the other series are disposed outside the dispensing opening and bear against the front side of the cabinet, as will be apparent from Fig. 15, the ends of the pintles being substantially enclosed by a flanged sheet metal shield 133 positioned at each side of the opening.

Pivotally attached to each of the end members 128 of the mouth are bars 134 and 134a which extend rearwardly and upwardly in the cabinet along the opposite sides, the opposite ends of these bars being interconnected by a bar 135 spanning the space therebetween and also being pivotally connected to vertical bars 136 and 136a, which in turn are pivotally connected to a fixed point of support, the bar 136 being attached to the rear of the cabinet at 137 and the bar 136a being attached to a fixed member 137a adjacent the bottom of the cabinet. A cross rod 138 interconnects the bars 134 and 134a intermediate their ends and carries and arm 139 which is pivotally secured on the rod intermediate its ends, one end of the arm having a roller 141 adapted to rest on the top of the stack and the opposite end thereof carrying a roller 142 supported in ways 143 secured to a transverse frame member 144 on the cabinet. This linkage is such that the weight of the dispensing mouth and the closures is carried on the arm 139, primarily, and the roller 141 rests against the top of the stack, as will be seen from Fig. 18. When the roller 141 and consequently the arm 139 is raised upwardly, the mouth likewise moves upwardly through the linkage and the mouth moves down with downward movement of the roller, the relationship being such that the dispensing mouth is thus maintained in approximate alignment with the top of the stack as the stack is depleted by removal of successive papers. Likewise the mouth automatically moves up when the roller 141 is raised to replenish the paper supply.

As in the previous embodiment, the coin mechanism 77 is secured within the cabinet against the front wall thereof and carries the conventional coin mechanism for latching or unlatching the handle 74. Secured across the inner face of the coin mechanism is a plate to which is secured upper and lower horizontal ways 145 and 145a. These ways carry slides 146 and 146a to which are attached vertical ways 147 and 147a, which in turn carry vertical slides 148 and 148a. A frame 149 has its spaced legs attached to slides 148 and 148a and projects out over the top of the stack, the vertical slides permitting vertical movement of the frame under gravity and permitting the frame to be raised for the replenishment of the stack. The frame carries a holder 151 substantially identical with the holder 98 of Fig. 14, which in turn supports pin holders 152 carrying pins as shown at 153, the pins and pin holder construction being substantially similar to that of Fig. 14 and operating in the same manner. A finger 154 is attached to the slides 147 and 147a and pivotally supports a rod 155 passing through a bracket 156 on a lever 157 corresponding to the lever 73 of the previous form, the lever being attached to the handle 74 on the exterior of the cabinet. A tension spring 158 acts to return the slides 146 and 146a to their left-hand position shown in Fig. 16.

In this form the newspapers indicated diagrammatically at 159 rest upon the bottom of the cabinet and are normally retained in located position by upstanding guides 161 and 162 within the cabinet (see Fig. 17). A detector finger 163 passes through a slot 164 in the bottom of the cabinet and is supported in such position that the stack of newspapers retains it in a lowermost position and so that when the last newspaper is removed the coin return lever 81 is properly actuated.

Figure 16:
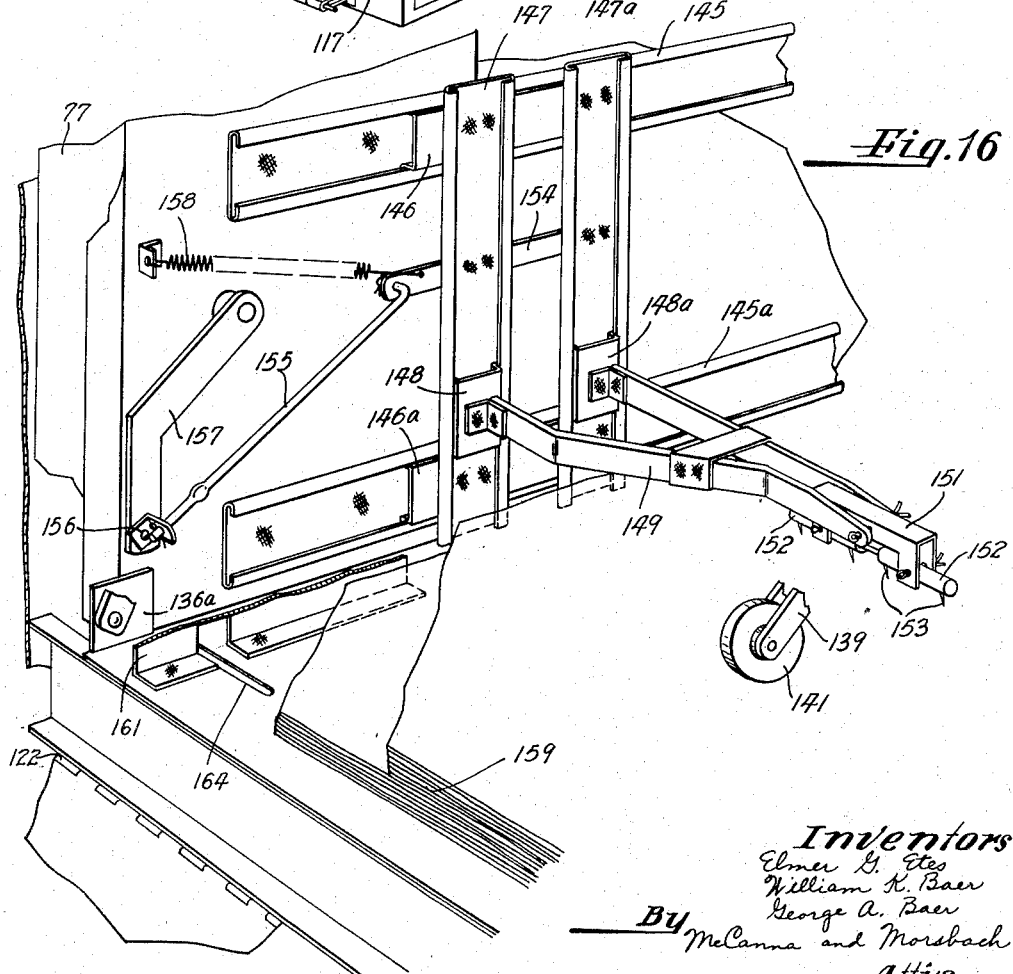
Fig. 16 is a fragmentary view of the embodiment of Fig. 15 showing the ejector mechanism.

In this embodiment when the handle 78 is depressed, upon the insertion of the proper coinage, the lever 157 acts through the rod 155 to move the ejector mechanism toward the right facing Fig. 16, the slides 146 moving in the ways 145. The pins, pin blocks and pin holder therebetween function in the manner heretofore described to engage the surface of the paper and force it outward through the dispensing mouth to a point at which it can be grasped from the exterior of the cabinet. At the end of this movement the roller 141 drops down off the topmost newspaper as shown in Fig. 18, thereby preventing the newspaper from returning in the event of unusual return force being applied thereto by the ejecting mechanism. When the handle is released the pin blocks and pin holder rotate to release the pins from the paper and allow them to slide freely along the surface. This is accomplished through the quaquaversal mounting of the pin blocks which also enables the ejecting mechanism to adjust itself to any irregularities in the surface of the paper against which it operates.

We claim:

1. A newspaper dispensing machine comprising a housing having a dispensing opening in one end thereof, a closure for said opening including a movable dispensing mouth and closure walls on opposite sides of the mouth to close the dispensing opening in all positions of the mouth, means for supporting a stack of newspapers within the housing with the papers disposed on edge, means for supporting the mouth in approximate alignment with the newspaper on one end of the stack, ejector means for moving the end newspaper of the stack through the dispensing mouth, means for moving the dispensing mouth across said opening in response to change in the depth of the stack to maintain the mouth and the end newspaper substantially in alignment, and means for limiting return movement of the mouth.

2. A newspaper dispensing machine comprising a housing having a dispensing opening at one end, the bottom of the housing sloping downwardly from front to back, means for retaining a stack of newspapers on the bottom of the housing in edgewise relation adjacent the rear of the housing, a plurality of pin blocks each having a plurality of needle point pins rigidly secured thereto and projecting therefrom for engagement with the paper on one end of the stack, a reciprocable slide secured to the front wall of the housing and disposed in a direction parallel to the bottom wall in spaced relation to the end paper, a connecting arm pivoted to the slide for movement in a direction transverse the slide toward the stack under gravity, means pivotally supporting the pin blocks for pivotal movement on the arm in a direction transverse the slide, manually operable means including an operating lever for moving the slide in a dispensing stroke toward the opening to urge the pins into the end paper and slide the same from the stack into the dispensing opening, and a lost motion connection between the lever and the slide to permit limited movement of the lever with respect to the slide.

3. A vending machine of the character described comprising a housing having a dispensing opening therein, means for supporting within the housing a stack of articles to be dispensed through the dispensing opening, a slide support pivotally mounted at the opposite side of the stack from said opening and extending across the stack toward said opening, a slide on said slide support movable thereon toward and away from the opening, a plurality of needle point pins supported on said slide for simultaneous engagement with the article on one end of the stack at an obtuse angle with respect to the surface of the article, means to bias the support toward the stack to hold the pins in engagement with the end article, means for effecting movement of the slide and pins crosswise of the stack to urge the pins into the end article and slide the same from the stack through the dispensing opening, and means for effecting return movement of the slide.

4. A vending machine as recited in claim 3 wherein the means for effecting movement of the slide comprises a manually operable handle and a linkage disposed between the handle and the slide having lost motion during initial movement of the handle.

5. A dispensing machine comprising a housing having a dispensing opening therein, a closure for said opening including a dispensing mouth, means for supporting within the housing a stack of articles to be dispensed with the article on one end of the stack in approximate alignment with the dispensing mouth, ejector means for moving the article on said one end of the stack through the dispensing mouth, means for effecting relative movement between the dispensing mouth and the stack in response to change in depth of the stack to maintain the mouth and the article on said one end of the stack in approximate alignment with depletion of the stack, said last mentioned means including a bar attached to the mouth and pivotally mounted at a point beyond the stack from the mouth, a second bar pivotally connected to the first bar at a point intermediate the ends of both bars, a roller attached to one end of the second bar positioned to bear against said one end of the stack, means restraining the second end of the second bar to straight line movement in the general direction of the pivotal support for the first bar, and means for urging the second end of the second bar in a direction to press the roller against said one end of the stack.

6. A dispensing machine of the character described comprising a housing having a dispensing opening therein, means for supporting within the housing a stack of articles to be dispensed through the dispensing opening, a plurality of needle point pins, means for supporting the pins for simultaneous engagement with the article on one end of the stack at an obtuse angle with respect to the surface of the article, means for effecting relative feeding movement between the pins and the stack in a direction approximately parallel with the surface of the article to urge the pins into the article and slide the article from the stack through the dispensing opening, said pin supporting means including a plurality of blocks each having a plurality of said pins rigidly secured therein and projecting therefrom in substantially coplanar relationship for simultaneous engagement with the stack, a holder for the blocks, means mounting the blocks on the holder for limited pivotal movement relative thereto in a plane normal to the stack, a lost motion connection between the blocks for limited independent movement thereof, a bracket for supporting the holder, means for pivotally supporting the bracket for vertical pivotal movement toward the stack under the force of gravity, means mounting the holder on the bracket for rotation in a vertical plane, and counterbalancing means operative on the holder to maintain the same in operative position with respect to the stack.

7. The combination in a dispensing machine for newspapers and the like, of a housing shaped to support therein articles arranged one upon the other in superimposed relationship in a stack, the housing having a dispensing opening in one side wall thereof, a closure for said opening including a horizontally disposed dispensing mouth movable vertically across the opening, an ejector mechanism extending across the top of the stack into engagement with the upper surface of the topmost article, means supporting the ejector mechanism for gravitational movement into contact with the topmost article in the stack, means for moving the ejector mechanism toward and away from the dispensing opening to slide successive articles from the top of the stack through the dispensing mouth, means responsive to the thickness of the stack for supporting the dispensing mouth in approximate alignment with the topmost article of the stack, said last mentioned means including a pair of somewhat horizontally disposed bars pivotally connected near one end to the mouth adjacent opposite ends thereof, a pair of somewhat vertically disposed bars each pivotally connected to one of the horizontal bars and to a fixed point on the housing, a connecting element interconnecting the two horizontal bars intermediate their ends and spanning the stack, an arm pivotally supported intermediate its ends on the connecting element, a roller pivotally connected to one end of the arm positioned to bear against the stack to apply at least part of the weight of the mouth and bars to the top of the stack, and means mounting the other end of the arm for substantially horizontal movement to permit the roller to move vertically with changes in height of the stack.

8. A dispensing machine of the character described comprising a housing having an opening therein, a closure for said opening including a movable dispensing mouth and closure walls on opposite sides of the dispensing mouth, said closure walls each comprising a plurality of rigid leaves pivotally interconnected at their edges in the form of an accordion fold, the end leaves being pivotally connected to the housing and to the dispensing mouth, means for supporting within the housing a stack of articles to be dispensed, a bar attached at one end to the dispensing mouth, means pivotally attaching the other end of the bar to the end of the housing remote from the opening for pivotal movement in a plane transverse the dispensing mouth, means attached to said bar intermediate the ends thereof and including a follower engageable with the article on one end of the stack for moving the bar as the stack is depleted to maintain the dispensing mouth in approximate alignment with the article on the end of the stack and means for moving the article on the end of the stack from the stack through the dispensing mouth.

9. A dispensing machine of the character described comprising a housing having a bottom wall, upstanding side walls and a dispensing opening at one end thereof, a closure for said opening including a vertically disposed dispensing mouth extending across said opening, means for supporting within said housing a stack of articles on edge in an upright position, a bar attached at one end thereof to one end of the dispensing mouth, means for pivotally attaching the other end of said bar to said housing adjacent the end thereof remote from said dispensing opening, means attached to said bar intermediate the ends thereof and including a follower engageable with the article on one end of the stack for maintaining said dispensing mouth in approximate alignment with said one end of the stack, said last mentioned means including spring means for urging said follower into engagement with said stack of articles to press said stack against one of said side walls and maintain said stack in an upright position, and ejector means for moving the article on said one end of the stack from the stack through the dispensing mouth.

10. A dispensing machine of the character described comprising a housing having a dispensing opening therein, a closure for said opening including a movable dispensing mouth extending across said opening, means for supporting within said housing a stack of articles to be dispensed, a bar having one end thereof attached to one end of the dispensing mouth, means pivotally supporting the other end of the bar on the housing adjacent the end thereof remote from the dispensing opening, means attached to said bar intermediate the ends thereof and including a follower engageable with the end article on said stack intermediate the sides of the stack and at a point spaced from said dispensing mouth for supporting said dispensing mouth in approximate alignment with the end article on the stack, and ejector means including a feed mechanism engageable with the stack intermediate said follower and said dispensing mouth for moving the article on said one end of the stack through the dispensing mouth.

11. A dispensing machine of the character described comprising a housing having a dispensing opening therein, means for supporting within the housing a stack of articles to be dispensed through the dispensing opening, a plurality of pins, means for supporting the pins for simultaneous engagement with the article on the end of the stack at an obtuse angle with respect to the surface of the article, said pin supporting means including a block having said pins rigidly secured therein, a carrier mounted for movement toward and away from the dispensing opening, a bracket for supporting the block, means pivotally supporting the bracket on the carrier for movement toward the stack in a plane transverse to the direction of movement of the carrier to hold the pins in contact with the end article on the stack, means for moving said carrier to effect feeding movement of the pins relative to the stack in a direction approximately parallel to the surface of the article on the stack, and means pivotally mounting the block on the bracket for limited movement in a plane transverse to the direction of feeding movement of the pins.

12. A newspaper dispensing machine comprising a housing having a bottom wall, a newspaper supporting rear wall extending upwardly from the bottom wall, a front wall, and a dispensing opening at one end of the housing, means for supporting a stack of newspapers on edge on said bottom wall and bearing against said support wall, a reciprocable slide mounted in said housing extending lengthwise thereof, said newspaper supporting rear wall and said slide converging toward each other in a direction towards the end of the housing having the dispensing opening therein, an arm pivotally attached to said slide for movement in a plane transverse thereto, a pin block having a plurality of pins therein pivotally attached to said arm for engagement with the newspaper on the end of the stack remote from said rear wall, and manually operable means for moving said slide in a dispensing stroke toward said opening to urge the pins in the pin block into the newspaper on said one end of the stack and slide the same from the stack into the dispensing opening, said arm pivoting upwardly as said slide is moved toward said dispensing opening to move the end newspaper in a direction transverse the direction of movement of the slide and thereby aid in separating the end newspaper from the stack.

13. The combination of claim 12 wherein the rear wall is inclined downwardly and forwardly to support said stack of newspapers in a vertically inclined position.

14. A dispensing machine of the character described comprising a housing having a dispensing opening therein, means for supporting within said housing a stack of articles, ejector means for moving the article on one end of the stack through the dispensing opening, said ejector means including a pair of pin blocks each having a plurality of pins rigidly attached thereto and projecting therefrom, a holder for the blocks, means mounting the blocks on the holdes for limited pivotal movement relative to the holder and to each other in a plane normal to the end of the stack, means pivotally supporting said holder for movement relative to the supporting means in the plane of movement of said blocks relative to the holder, means including said holder supporting means for effecting feeding movement of the holder in a direction approximately parallel to said one end of the stack and normal to the plane of movement of said pin blocks relative to said holder to urge the pins into the article and slide the article on the end of the stack from the stack through the opening.

15. The combination of claim 14 including spring means acting between said pin blocks normally urging said pin blocks into alignment with each other.

References Cited in the file of this patent

UNITED STATES PATENTS

| | | |
|---|---|---|
| 363,379 | Flint | May 24, 1887 |
| 467,893 | Ford et al. | Jan. 26, 1892 |
| 588,066 | Hoyt | Aug. 10, 1897 |
| 839,304 | Long | Dec. 25, 1906 |
| 1,028,091 | Matthews | May 28, 1912 |
| 1,127,991 | Harbaugh | Feb. 9, 1915 |
| 1,151,347 | Dueber | Aug. 24, 1915 |
| 2,013,024 | Bollinger | Sept. 3, 1935 |
| 2,138,682 | Storck | Nov. 29, 1938 |
| 2,273,814 | Bartel et al. | Feb. 24, 1942 |
| 2,501,970 | Sawitzke | Mar. 28, 1950 |
| 2,572,121 | Dosberg | Oct. 23, 1951 |
| 2,576,636 | Opgenorth | Nov. 27, 1951 |
| 2,579,068 | Davis et al. | Dec. 18, 1951 |
| 2,612,426 | Hawks | Sept. 30, 1952 |

FOREIGN PATENTS

| | | |
|---|---|---|
| 17,537 | Sweden | May 7, 1904 |